(12) United States Patent
Lee et al.

(10) Patent No.: US 7,874,186 B2
(45) Date of Patent: Jan. 25, 2011

(54) ABNORMAL VIBRATION SENSING APPARATUS AND WASHING MACHINE HAVING THE SAME

(75) Inventors: Sang-Hoon Lee, Seoul (KR); Tea-Hee Lee, Bucheon (KR)

(73) Assignee: LG Electronics Inc., Seoul (KR)

( * ) Notice: Subject to any disclaimer, the term of this patent is extended or adjusted under 35 U.S.C. 154(b) by 1043 days.

(21) Appl. No.: 11/464,327

(22) Filed: Aug. 14, 2006

(65) Prior Publication Data

US 2007/0039359 A1    Feb. 22, 2007

(30) Foreign Application Priority Data

Aug. 18, 2005    (KR) ...................... 10-2005-0075836

(51) Int. Cl.
*D06F 37/22* (2006.01)
(52) U.S. Cl. ........................... 68/23.1; 68/12.06; 68/24; 68/58
(58) Field of Classification Search ................ 68/12.06, 68/23.2, 23.1, 24, 58; 73/660; 340/683
See application file for complete search history.

(56) References Cited

U.S. PATENT DOCUMENTS

| | | | | |
|---|---|---|---|---|
| 4,368,637 A | * | 1/1983 | Anderson | 73/652 |
| 5,194,707 A | * | 3/1993 | Wallach | 200/61.45 R |
| 5,255,916 A | * | 10/1993 | Bleich | 273/118 D |
| 5,396,223 A | * | 3/1995 | Iwabuchi et al. | 340/690 |
| 6,087,936 A | * | 7/2000 | Woods | 340/566 |
| 2004/0148973 A1 | * | 8/2004 | No et al. | 68/12.06 |
| 2005/0251926 A1 | | 11/2005 | Lee et al. | |
| 2006/0042328 A1 | * | 3/2006 | Komatsu et al. | 68/12.06 |
| 2006/0053839 A1 | * | 3/2006 | Matsushima et al. | 68/3 R |
| 2006/0075791 A1 | | 4/2006 | Seo et al. | |
| 2006/0191301 A1 | | 8/2006 | Park et al. | |

* cited by examiner

*Primary Examiner*—Joseph L Perrin
*Assistant Examiner*—Benjamin Osterhout
(74) *Attorney, Agent, or Firm*—KED & Associates, LLP

(57) ABSTRACT

A washing machine has an abnormal vibration sensing apparatus. The abnormal vibration sensing apparatus includes a limiter having at least one opened side and connected to one of a vibrating body and a fixing body, a sensing rod having one end that is received in the limiter and separated from an inner wall of the limiter, and the other end that is connected to another of the vibrating body and the fixing body, and a contact sensing unit sensing whether the limiter and the sensing rod are in contact with each other so as to sense abnormal vibration of the vibrating body. According to this construction, it is possible to easily detect abnormal vibration in a plurality of directions without increasing the number of installing abnormal vibration sensing apparatuses.

18 Claims, 8 Drawing Sheets

ABNORMAL VIBRATION SENSING APPARATUS AND WASHING MACHINE HAVING THE SAME

The present disclosure relates to subject matter contained in priority Korean application No. 10-2005-0075836, filed on Aug. 18, 2005, which is herein expressly incorporated by reference in its entirety.

BACKGROUND OF THE INVENTION

1. Field of the Invention

The present invention relates to an abnormal vibration sensing apparatus, and more particularly, to an abnormal vibration sensing apparatus that easily detect abnormal vibration in a plurality of directions without increasing the number of installing abnormal vibration sensing apparatuses, and a washing machine having the same.

2. Description of the Background Art

Generally, a washing machine includes a cabinet having a receiving space therein, a tub provided in the cabinet, and a washing tub rotatably received in the tub.

The cabinet has a rectangular parallelepiped shape, and is provided with a tub having a cylindrical shape for receiving water therein. The tub is supported by a spring and a damper so as to attenuate vibration generated when the washing tub is rotated.

An abnormal vibration sensing apparatus for sensing excessive vibration of the tub in a certain direction is provided in the cabinet. The abnormal vibration sensing apparatus is installed so as to be separated from the tub with a certain distance in a direction.

However, in the related art washing machine, the abnormal vibration sensing apparatus is installed so as to sense a displacement of the tub only in one direction. Therefore, when a direction of the tub to be sensed is increased, the number of the abnormal vibration sensing apparatuses is increased thus to cause a complicated construction, an increased assembly time, and an increased fabrication cost.

BRIEF DESCRIPTION OF THE INVENTION

Therefore, an object of the present invention is to provide an abnormal vibration sensing apparatus that easily detect abnormal vibration in a plurality of directions without increasing the number of installing abnormal vibration sensing apparatuses, and a washing machine having the same.

To achieve these and other advantages and in accordance with the purpose of the present invention, as embodied and broadly described herein, there is provided an abnormal vibration sensing apparatus comprising a limiter having at least one opened side and connected to one of a vibrating body and a fixing body, a sensing rod having one end that is received in the limiter and separated from an inner wall of the limiter, and the other end that is connected to another of the vibrating body and the fixing body, and a contact sensing unit sensing whether the limiter and the sensing rod are in contact with each other so as to sense abnormal vibration of the vibrating body.

To achieve these and other advantages and in accordance with the purpose of the present invention, as embodied and broadly described herein, there is provided a washing machine having an abnormal vibration sensing apparatus comprising: a cabinet having a receiving space therein; a tub received and installed in the cabinet; and an abnormal vibration sensing apparatus for sensing an abnormal vibration of the tub, wherein the abnormal vibration sensing apparatus includes a limiter having at least one opened side and connected to one of the cabinet and the tub, a sensing rod having one end provided in the limiter and disposed to be separated from an inner wall of the limiter, and the other end connected to another of the cabinet and the tub, and a contact sensing unit sensing whether the limiter and the sensing rod are in contact with each other.

According to still another embodiment of the present invention, there is provided a washing machine having an abnormal vibration sensing apparatus, comprising: a cabinet having a receiving space therein; a tub installed in the cabinet; and an abnormal vibration sensing apparatus for sensing an abnormal vibration of the tub, wherein the abnormal vibration sensing apparatus includes a limiter fixed to the cabinet or the tub, a sensing rod arranged in the limiter, and a contact sensing unit for sensing abnormal vibration of the tub by a relative motion of the limiter and the sensing rod.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
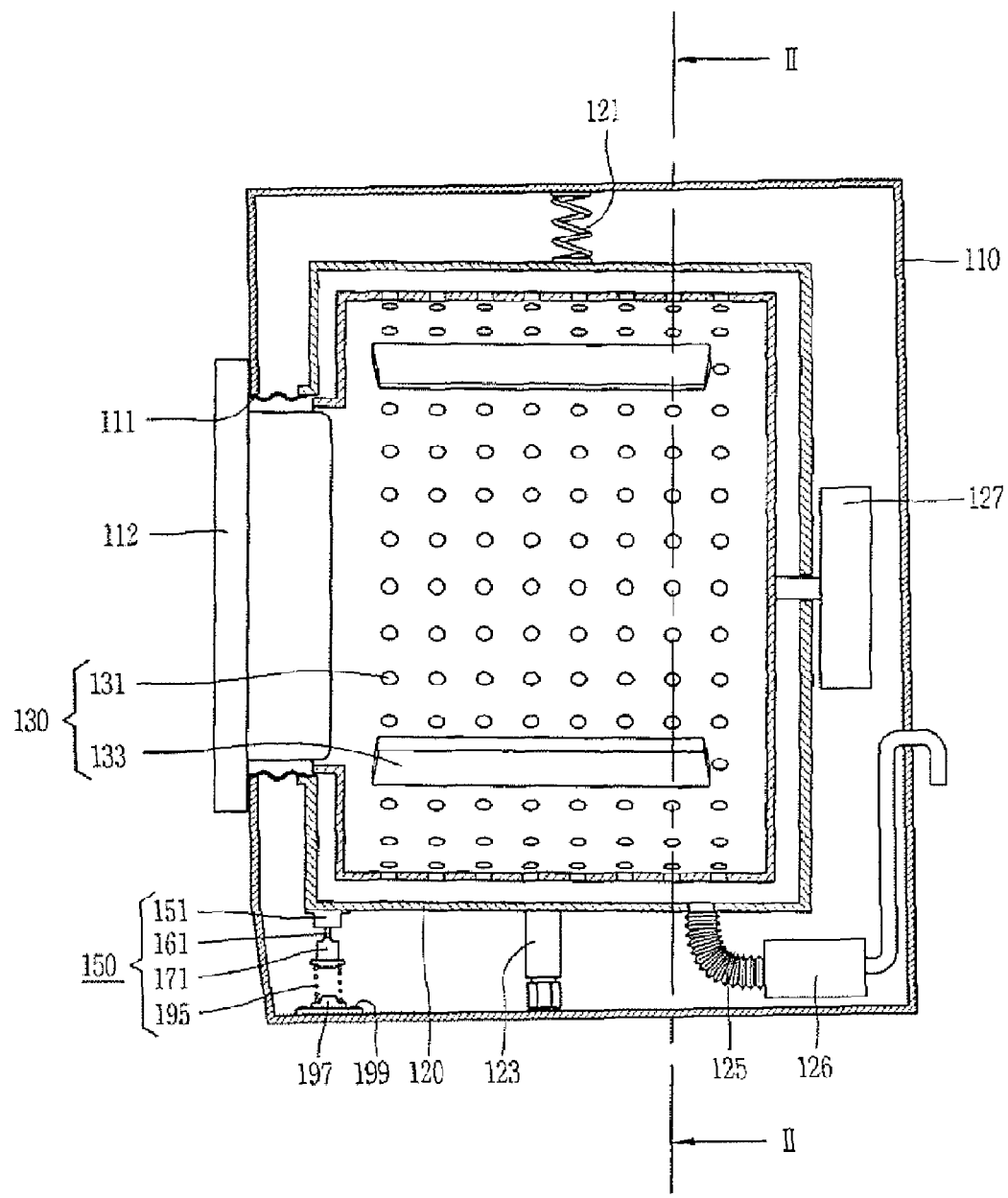
FIG. 1 is a longitudinal sectional view of a washing machine having an abnormal vibration sensing apparatus according to one embodiment of the present invention.
Figure 2:
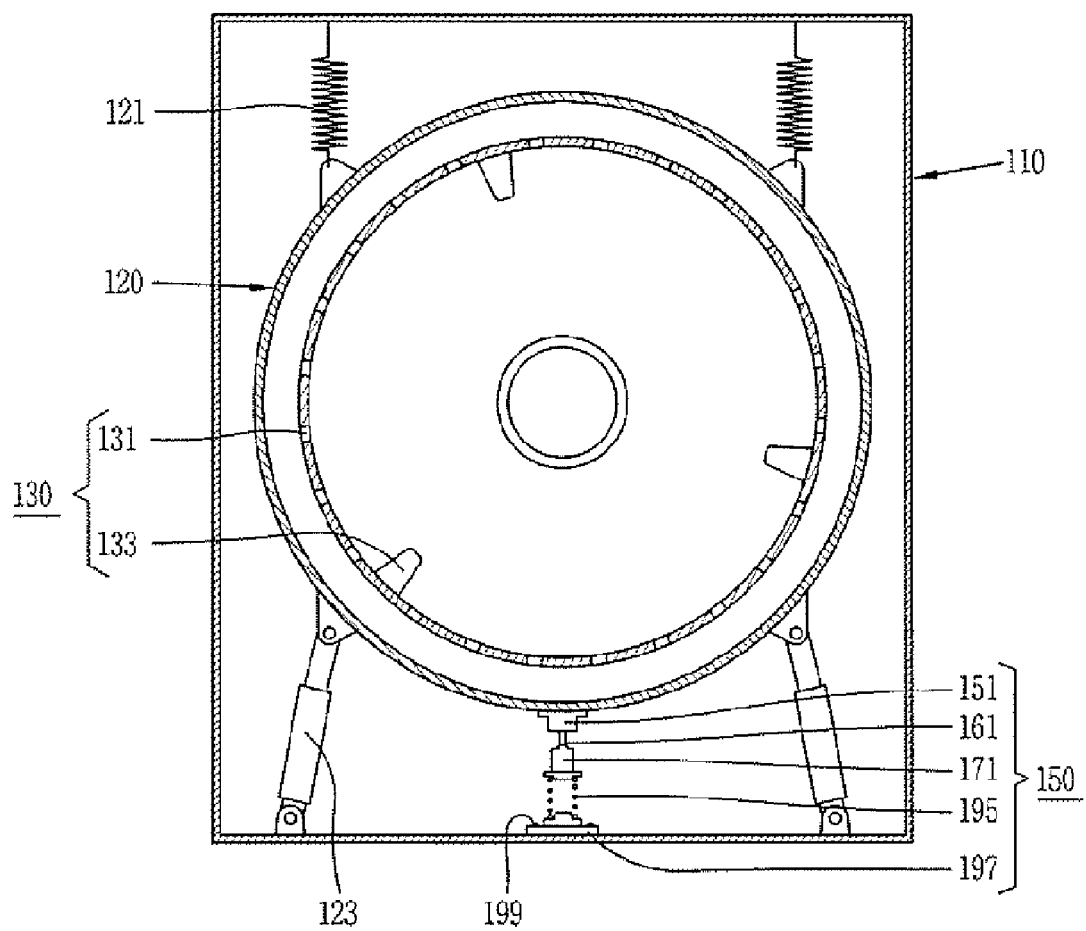
FIG. 2 is a sectional view taken along line II-II of the washing machine of FIG. 1.
Figure 3:
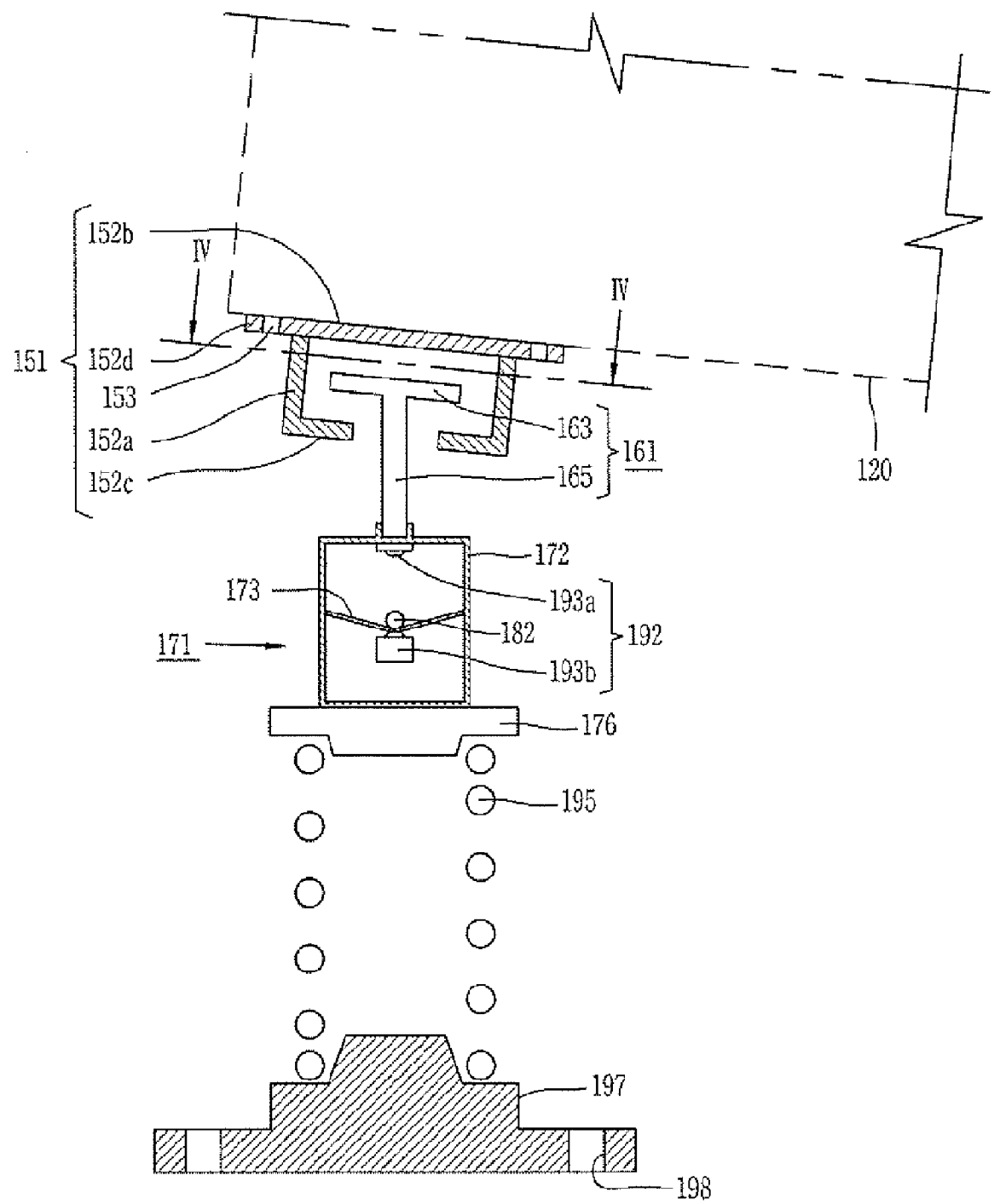
FIG. 3 is an enlarged longitudinal sectional view of the abnormal vibration sensing apparatus according to one embodiment of the present invention.
Figure 4:
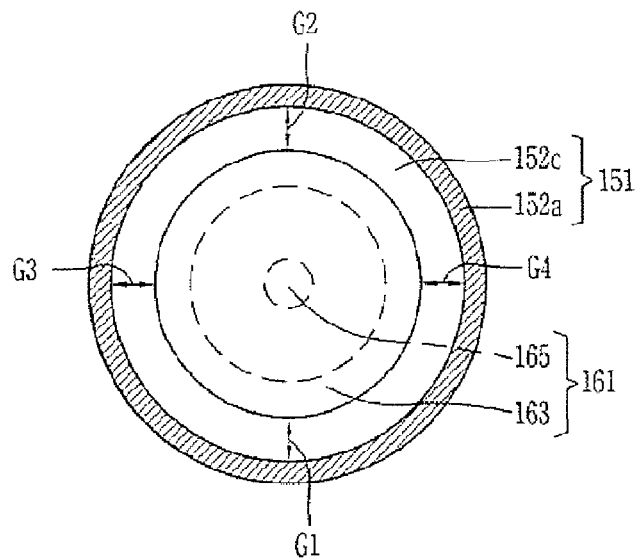
FIG. 4 is a sectional view taking along the line IV-IV of the washing machine shown in FIG. 3.
Figure 5:
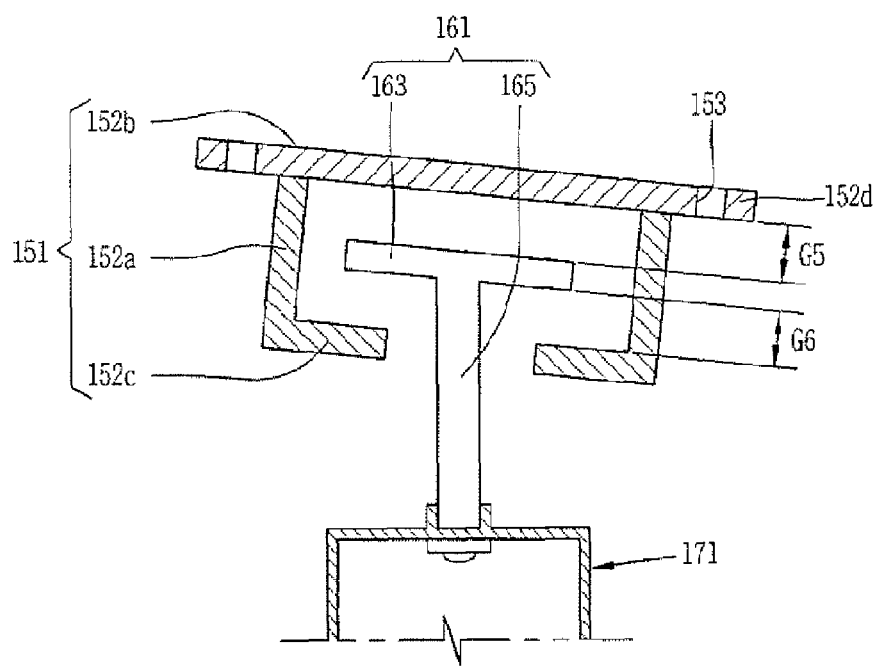
FIG. 5 is an enlarged view of the abnormal vibration sensing apparatus shown in FIG. 3.
Figure 6:
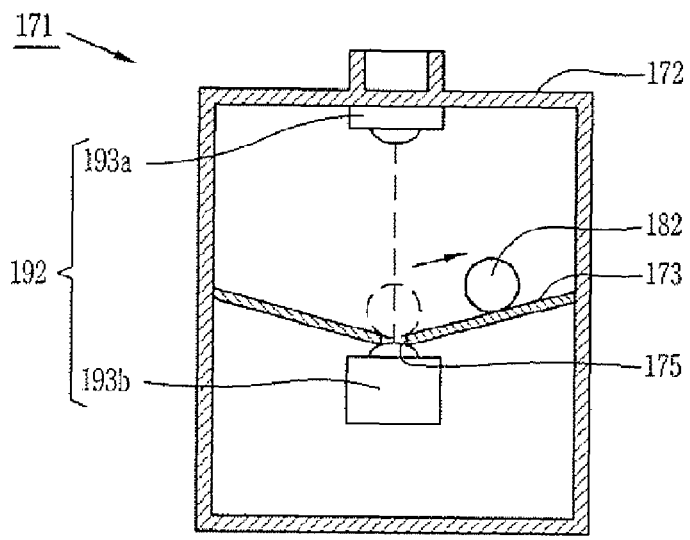
FIG. 6 is a view showing an operation of a ball sensor of FIG. 1.

Hereinafter, a washing machine having an abnormal vibration sensing apparatus according to one embodiment of the present invention will be described in detail with reference to the accompanying drawings. As shown FIGS. 1 and 2, a washing machine having an abnormal vibration sensing apparatus according to one embodiment of the present invention includes a cabinet 110 having a receiving space therein, a tub 120 provided in the cabinet 110, and an abnormal vibration sensing apparatus 150 interposed between the tub 120 and the cabinet 110 and sensing abnormal vibration that exceeds a normal vibration range of the tub 120 in a plurality of directions.

An opening 111 and a door 112 are provided at one side of the cabinet 110 so as to allow laundry to be put into or taken out of the cabinet 110. A tub 120 that receives washing water is provided in the cabinet 110 and supported by a support spring 121 and a damper 123. A drainage path 125 having a drain pump 126 is connected to a lower area of the tub 120, and a drum 130 is rotatably received and installed in the tub 120. A drum driving motor 127 is coupled with a rear end portion of the tub 120 so as to rotatably drive the drum 130. The drum 130 includes a cylindrical shape having one open side, and a plurality of holes 131 are formed at a circumferential surface thereof. A plurality of lifts 133 are provided in the drum 130 so as to move the laundry upwards.

Meanwhile, an abnormal vibration sensing apparatus 150 is provided at a front lower area of the tub 120 so as to sense abnormal vibration of the tub 120. As shown FIGS. 3 to 6, the abnormal vibration sensing apparatus 150 includes a limiter 151 having at least one opened side so as to form a receiving space therein and integrally coupled with the tub 120, a sensing rod 161 having one side, which is provided in the limiter 151 and disposed to be separated from an inner wall of the limiter 151, and a ball sensor 171 integrally coupled with the sensing rod 161 and serving as a contact sensing unit that senses abnormal vibration of the tub 120 when the limiter 151 and the sensing rod 161 impact and come in contact with each other more than a predetermined level.

The limiter 151 includes a cylindrical portion 152a having a cylindrical shape, a blocking portion 152b formed to block one side of the cylindrical portion 152a, and a stopping portion 152c formed at a facing surface of the blocking portion 152b. A flange portion 152d that extends outwards in a radial direction and fixedly couples the limiter 151 with a vibrating body such as the tub 120 is formed at the cylindrical portion 152a. A plurality of fixing holes are formed in the flange portion 125d such that the flange portion 125d is integrally coupled with the vibrating body, such as the tub 120, by a fixing member, such as a screw.

The sensing rod 161 includes a plate-like portion 163 disposed in the cylindrical portion 152a, and a rod portion 165 having one end integrally connected with the plate-like portion 163 and the other end extending outwards through an open area of the limiter 151.

Here, the limiter 151 may be formed of two or more separate portions so as to receive the plate-like portion 163 therein, and the two or more separate portions may be coupled to each other after the plate-like portion 163 is received in the limiter 151. Alternatively, a through hole into which the plate-like portion 163 can be inserted is formed in the cylindrical portion 152a, the stopping portion 152c, or the blocking portion 152b. In a state that the plate-like portion 163 is received in the cylindrical portion 152a, the rod portion 165 may be integrally coupled with the plate-like portion 163.

Figure 7:
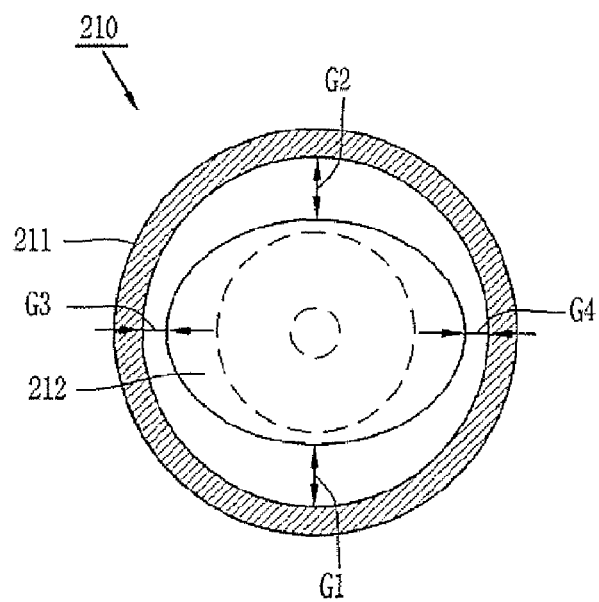
FIGS. 7 to 9 are sectional views of a limiter and a sensing body of an abnormal vibration sensing apparatus according to another embodiment of the present invention, which correspond to those of FIG. 4.
Figure 8:
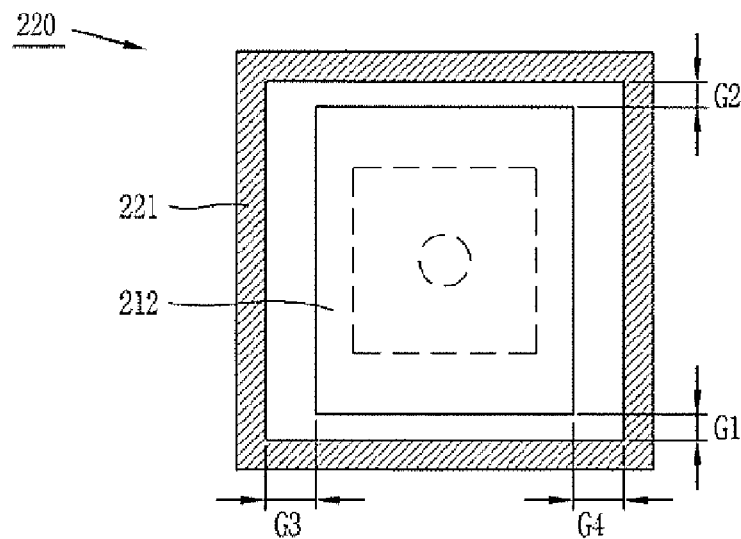
Figure 9:
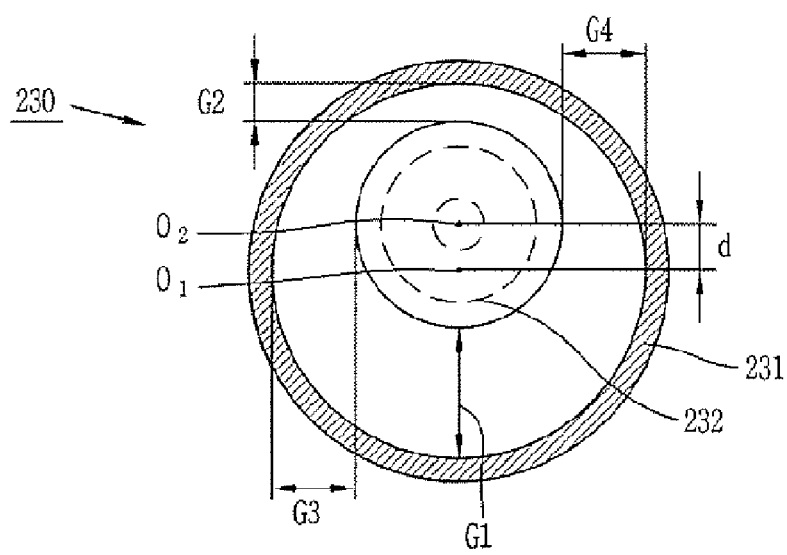

Preferably, the plate-like portion 163 is disposed in the cylindrical portion 152a and separated from the inner wall of the cylindrical portion 152a, the blocking portion 152b, and the stopping portion 152c by sensing distances G1 to G6 of sensing directions. That is, gaps G1 to G4 between the plate-like portion 163 and the inner wall of the cylindrical portion 152a according to the front, rear, left, and right directions, a gap G5 between an upper surface of the plate-like portion 163 and the blocking portion 152b according to a vertical direction of the cabinet 110, and a gap G6 between a lower surface of the plate-like portion 163 and the stopping portion 152c may be the same or different from each other so as to correspond to the sensing distances in the respective directions. For example, as shown in FIG. 7, an abnormal vibration sensing apparatus 210 includes a limiter 211 having at least one opened side, and a sensing rod having a plate-like portion 212 having an oval shape so as to have different sensing distances G1 to G4 in directions perpendicular to each other (e.g., front, rear, left, and right). Alternatively, as shown in FIG. 8, an abnormal vibration sensing apparatus 220 includes a limiter 221 having a rectangular ring shape in plane section, and a sensing rod having a plate-like portion 222 having a rectangular shape so as to have different sensing distances G1 to G4 in directions perpendicular to each other. Further, as shown in FIG. 9, an abnormal vibration sensing apparatus 230 includes a limiter 231 having a circular ring shape in plane section, and a sensing rod having a plate-like portion 232 having a circular shape. In this case, the center O2 of the plate-like portion 232 is separated from the center O1 of the limiter 231 at a predetermined distance (d) such that a gap G2 between the limiter 231 in one side direction and the plate-like portion 232 is smaller than gaps G1, G3, and G4 in other directions.

Meanwhile, the ball sensor 171 is integrally connected with the rod portion 165. The ball sensor 171 includes a housing 172 having a receiving space therein, a ball 182 movably provided in the housing 172 and received at an initial position, and a sensing unit 192 sensing separation of the ball 182 from the initial position. A guide surface 173 that is inclined downwards toward the center is formed in the housing 172 such that when an external force is not applied, the ball 182 is at the initial position of the center inside the housing 172. A hole 175 through which light can pass is formed at the central area of the guide surface 173. The sensing unit 192 includes a light emitting portion 193a and a light receiving portion 193b that are disposed at upper and lower sides, respectively, in the vertical direction of the housing 172 with the ball 182 at the initial position interposed therebetween. Meanwhile, a return spring 195 is provided below the ball sensor 171 and supports such that the ball sensor 171 and the sensing rod 161 can return to the initial positions thereof.

A spring coupling portion 176 is integrally formed with a lower portion of the housing 172 such that the spring coupling portion 176 is coupled with an upper end of the return spring 195. A spring support unit 197 that is integrally fixed to the lower portion of the cabinet 110 and supports the return spring 195 is coupled with a lower end of the return spring 195. A plurality of screw holes 198 through which a screw 199 passes are formed through the spring support unit 197. Herein, the screw 199 is coupled to the lower surface of the cabinet 110 or the like.

According to the above-described construction, when the tub 120 is excessively moved in one direction because of vibration generated when the drum 130 is driven, the limiter 151 integrally coupled to the tub 120 is moved relative to the sensing rod 161 and comes in contact with the sensing rod 161 thus to generate an impact force. Herein, when an impact applied to the bail sensor 171 is more than a predetermined level, the ball 182 inside the housing 172 is deviated from the initial position thereof. The light receiving portion 193b senses light that is correspondingly emitted from the light emitting portion 193a and outputs sensing signals, such that the vibration of the tub 120 is sensed as abnormal vibration that deviates from a normal state. Meanwhile, when a vibration range of the tub 120 narrows or the tub 120 stops, the ball sensor 171 returns to the initial position, where the bail sensor 171 is initially positioned, because of an elastic force of the return spring 195. Further, the ball 182 inside the housing 172 returns to the initial position along the guide surface 173 and blocks a path of light emitted from the light emitting portion 193a.

Figure 10:
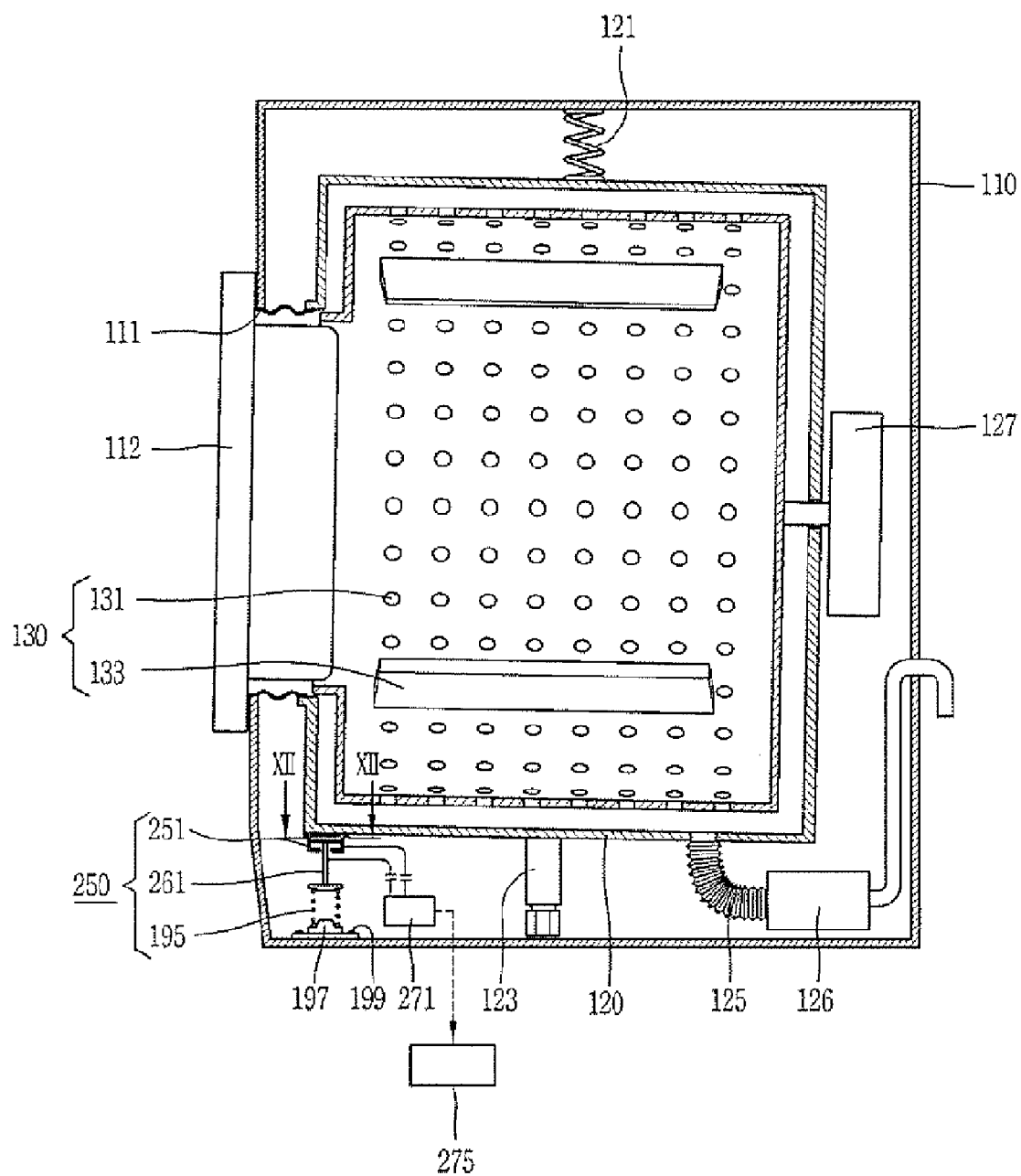
FIG. 10 is a sectional view of a washing machine having an abnormal vibration sensing apparatus according to still another embodiment of the present invention.
Figure 11:
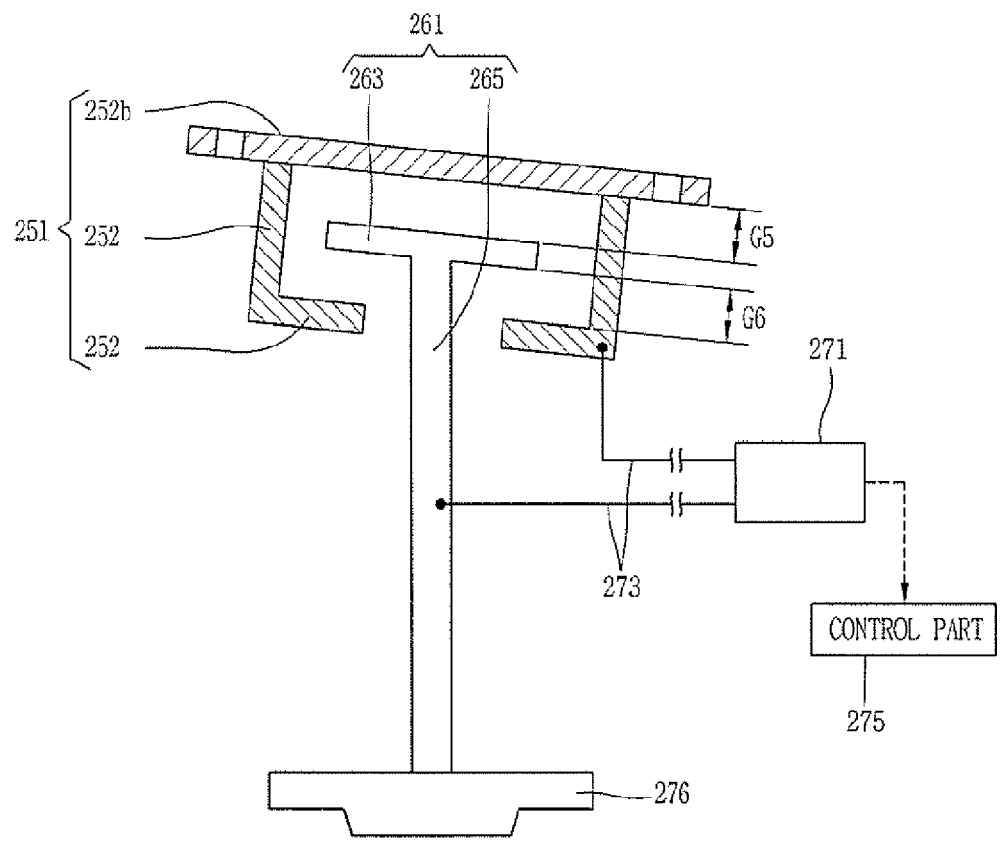
FIG. 11 is an enlarged view of the abnormal vibration sensing apparatus shown in FIG. 10.
Figure 12:
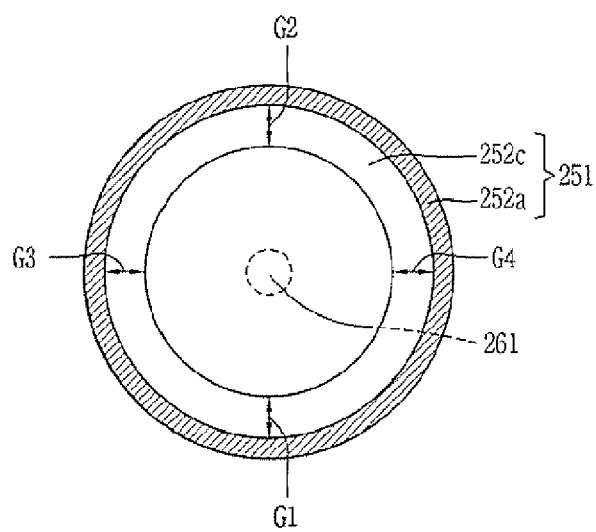
FIG. 12 is a sectional view taken along line of XII-XII of the abnormal vibration sensing apparatus of FIG. 10.

Hereinafter, a washing machine having an abnormal vibration sensing apparatus according to another embodiment of the present invention will be explained with reference to FIGS. 10 to 12. The washing machine having an abnormal vibration sensing apparatus comprises a cabinet 110 having a receiving space therein, the tub 120 provided in the cabinet 110, and an abnormal vibration sensing apparatus 250 interposed between the tub 120 and the cabinet 110 and sensing abnormal vibration that exceeds a normal vibration range of the tub 120 in a plurality of directions.

An opening 111 and a door 112 are provided at one side of the cabinet 110 so as to allow laundry to be put into or taken out of the cabinet 110. The tub 120 having a cylindrical shape whose one side is opened is provided in the cabinet 110 and supported by a support spring 121 and a damper 123. A drainage path 125 having a drain pump 126 is connected to a lower area of the tub 120. A drum 130 is rotatably received and installed in the tub 120. A drum driving motor 127 is coupled with a rear end portion of the tub 120 so as to rotatably drive the drum 130. A plurality of holes 131 are formed at a circumferential surface of the drum A plurality of lifts 133 are provided in the drum 130 so as to move the laundry upwards.

Meanwhile, an abnormal vibration sensing apparatus 250 is provided at a front lower area of the tub 120 so as to sense abnormal vibration of the tub 120. As shown in FIGS. 10 to 12, the abnormal vibration sensing apparatus 250 includes a limiter 251 formed of a conductor and having a ring shape in section so as to form a receiving space therein and integrally coupled with the tub 120, a sensing rod 161 formed of the conductor in a rod shape and having one side, which is provided in the limiter 251 and disposed to be separated from an inner wall of the limiter 251, and an electrical connection sensing unit 271 serving as a contact sensing unit that, when the limiter 251 and the sensing rod 161 come in contact with each other, senses this, electrically connected with the limiter 251 and the sensing rod 261 to apply an electric current thereto and sensing whether an electrical connection is formed or not.

The limiter 251 includes a cylindrical portion 252a having a cylindrical shape, a blocking portion 252b formed to block one side of the cylindrical portion 252a, and a stopping portion 252c formed at a facing surface of the blocking portion 252b. The sensing rod 261 includes a rod portion 265 formed in a rod shape and having one end inserted into the cylindrical portion 252a, and a plate-like portion 263 integrally coupled with an end portion of the insertion side of the rod portion 265. A spring coupling portion 276 is formed at a lower end of the rod portion 265 housing 172 such that the spring coupling portion 176 is coupled with of the return spring 195. A spring support unit 197 that is fixed by the screw 199 and supports the return spring 195 is coupled with a lower end of the return spring 195.

Preferably, the plate-like portion 263 is disposed in the limiter 251 and separated from an inner wall of the cylindrical portion 252a, the blocking portion 252b, and the stopping portion 252c by sensing distances G1 to G6 of sensing directions. That is, gaps G1 to G4 between the plate-like portion 263 and the inner wall of the cylindrical portion 252a according to the front, rear, left, and right directions, a gap G5 between an upper surface of the plate-like portion 263 and the blocking portion 252b according to a vertical direction of the cabinet 110, and a gap G6 between a lower surface of the plate-like portion 263 and the stopping portion 252c may be the same or different from each other so as to correspond to the sensing distances in the respective directions as described above referring to FIGS. 7 to 9.

Meanwhile, when the limiter 251 and the sensing rod 261 formed of conductors, respectively, come in contact with each other, the limiter 251 and the sensing rod 261 are connected to the electrical connection sensing unit 271 that has lead lines 273 connected to the limiter 251 and the sensing rod 261, respectively, for electrical connection. Further, when the limiter 251 and the sensing rod 261 come in contact with each other, the electrical connection sensing unit 271 senses this according to whether the electrical connection is formed or not. Here, the electrical connection sensing unit 271 is connected to a control unit 275 that controls components of the washing machine, and outputs electrical signals to the control unit 275 when the limiter 251 and the sensing rod 261 comes in contact with each other.

According to the above-described construction, when the tub 120 is excessively moved in one direction because of vibration generated when the drum 130 is driven, the limiter 251 integrally coupled with the tub 120 is moved relative to the sensing rod 261. Then, the inner wall of the limiter 251 and the plate-like portion 263 come in contact with each other. When the limiter 251 and the plate-like portion 263 come in contact with each other, an electric current is applied to the limiter 251, the plate-like portion 263, and the electrical connection sensing unit 271. The electrical connection sensing unit 271 outputs electrical signals to the control unit 275. According to this, the control unit 275, which is implemented as a microcomputer, senses abnormal vibration of the tub.

Meanwhile, when a vibration range of the tub 120 narrows or the tub 120 stops, the limiter 251 returns to its initial position, and the limiter 251 and the plate-like portion 263 remain to be separated from each other.

As described above, according to an aspect of the present invention, it is possible to easily sense a plurality of abnormal vibrations generated in the same plane direction of the vibrating body without increasing the number of abnormal vibration sensing apparatuses to be installed.

In addition, according to the aspect of the invention, it is possible to easily sense abnormal vibrations generated in a plurality of directions on the basis of the fixing body, that is, abnormal vibrations of the vibrating body in the front, rear, left, right, top and bottom directions of the fixing body without increasing the number of abnormal vibration sensing apparatuses to be installed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims and therefore all changes and modifications that fall within the metes and bounds of the claims, or equivalents of such metes and bounds are therefore intended to be embraced by the appended claims.

What is claimed is:

1. A washing machine having an abnormal vibration sensing apparatus, comprising:
   a cabinet having a receiving space therein;
   a tub received and installed in the cabinet; and
   an abnormal vibration sensing apparatus, wherein the abnormal vibration sensing apparatus includes:
      a limiter having at least one opened side to form a receiving space and being integrally coupled to a lower area of the tub such that the limiter moves in direct correlation with the tub;
      a sensing rod including a plate-like portion and a rod portion having a first end connected to the plate-like portion and the rod portion extends in a longitudinal direction outwards through the opened side of the limiter to a second end, and the plate-like portion is provided in the limiter and is disposed to be separated from an inner wall of the limiter, and the limiter to move in direct correlation with the tub and the limiter to move relative to the sensing rod; and
      a contact sensing unit, coupled to the second end of the rod portion, to sense whether the limiter and the plate-like portion contact each other.

2. The washing machine having the abnormal vibration sensing apparatus of claim 1, wherein the contact sensing unit has a ball sensor that includes:
   a housing having a receiving space therein;
   a ball received in the housing, the ball to deviate from an initial position when more than a predetermined external force is applied and to return to the initial position when the external force is released; and
   a ball sensing unit including a light emitting portion and a light receiving portion that are separated from each other with the ball interposed therebetween, and the ball sensing unit sensing separation of the ball from the initial position.

3. The washing machine having the abnormal vibration sensing apparatus of claim 2, wherein the ball sensor is integrally connected with the second end of the rod portion of the sensing rod.

4. The washing machine having the abnormal vibration sensing apparatus of claim 3, further comprising:
   a return spring having one side connected to the ball sensor and the other side connected to a fixed body so as to return the ball sensor and the sensing rod to the initial positions thereof.

5. The washing machine having the abnormal vibration sensing apparatus of claim 2, further comprising:
   a coupling portion formed with a lower portion of the housing;
   a support unit coupled to a lower portion of the cabinet; and
   a spring coupled between the coupling portion and the support unit.

6. The washing machine having the abnormal vibration sensing apparatus of claim 1, wherein the limiter includes a blocking portion that blocks one side thereof such that the limiter and the plate-like portion of the sensing rod come in contact with each other along the longitudinal direction of the sensing rod when the limiter and the sensing rod approach one another.

7. The washing machine having the abnormal vibration sensing apparatus of claim 6, wherein the plate-like portion is integrally formed with the sensing rod inside the limiter.

8. The washing machine having the abnormal vibration sensing apparatus of claim 1, wherein the limiter and the plate-like portion of the sensing rod are formed of conductors, and the contact sensing unit includes an electrical connection sensing unit that is electrically connected to the limiter and the sensing rod so as to apply an electrical current thereto, and the electrical connection sensing unit outputs electrical signals when the limiter and the sensing rod contact each other.

9. The washing machine having the abnormal vibration sensing apparatus of claim 8, wherein the limiter and the sensing rod are spaced from each other with certain distances corresponding to predetermined gaps according to sensing directions.

10. The washing machine having the abnormal vibration sensing apparatus of claim 1, wherein the limiter is integrally coupled to a lower front area of the tub.

11. A washing machine having an abnormal vibration sensing apparatus, comprising:
   a cabinet having a receiving space therein;
   a tub installed in the cabinet; and
   an abnormal vibration sensing apparatus for sensing an abnormal vibration of the tub, wherein the abnormal vibration sensing apparatus includes:
      a limiter coupled to a lower area of the tub, the limiter to move in correlation with the tub,
      a sensing rod at least partially arranged in the limiter, and
      a contact sensing unit for sensing abnormal vibration of the tub by motion of the limiter relative to the sensing rod, wherein the sensing rod includes a plate-like portion provided in the limiter and a rod portion that extends outwards from the limiter, wherein the rod portion extends in a longitudinal direction from a first end provided in the limiter coupled to the tub to a second end coupled to the contact sensing unit.

12. The washing machine having the abnormal vibration sensing apparatus of claim 11, wherein the limiter includes a blocking portion that blocks one side thereof such that the limiter and the plate-like portion of the sensing rod can contact each other along the longitudinal direction of the sensing rod when the limiter and the sensing rod approach one another.

13. The washing machine having the abnormal vibration sensing apparatus of claim 11, wherein the plate-like portion is integrally formed with the rod portion.

14. The washing machine having the abnormal vibration sensing apparatus of claim 11, wherein the limiter and the sensing rod are formed of conductors, and the contact sensing unit includes an electrical connection sensing unit that is electrically connected to the limiter and the sensing rod so as to apply an electrical current thereto and to output electrical signals when the limiter and the sensing rod contact each other.

15. The washing machine having the abnormal vibration sensing apparatus of claim 11, wherein the limiter and the plate-like portion of the sensing rod are spaced from each other with certain distances corresponding to predetermined gaps according to sensing directions.

16. The washing machine having the abnormal vibration sensing apparatus of claim 11, wherein the limiter is integrally coupled to a lower front area of the tub.

17. The washing machine having the abnormal vibration sensing apparatus of claim 11, wherein the contact sensing unit has a ball sensor that includes:
   a housing having a receiving space therein;
   a ball received in the housing, the ball to deviate from an initial position when an external force is applied and to return to the initial position when the external force is released; and
   a ball sensing unit including a light emitting portion and a light receiving portion that are separated from each other with the ball interposed therebetween, and the ball sensing unit to sense movement of the ball from the initial position.

18. The washing machine having the abnormal vibration sensing apparatus of claim 17, further comprising:
   a coupling portion formed with a lower portion of the housing;
   a support unit coupled to a lower portion of the cabinet; and
   a spring coupled between the coupling portion and the support unit.

* * * * *